United States Patent [19]

Schick

[11] Patent Number: 4,538,755
[45] Date of Patent: Sep. 3, 1985

[54] APPARATUS FOR FIXING BELT-FASTENERS OR THE LIKE

[75] Inventor: Jean-François Schick, Paris, France

[73] Assignee: Goro S.A., Chelles, France

[21] Appl. No.: 647,276

[22] Filed: Sep. 4, 1984

Related U.S. Application Data

[63] Continuation of Ser. No. 364,667, Apr. 2, 1982, abandoned.

[30] Foreign Application Priority Data

Jun. 12, 1981 [FR] France .................. 81 11588

[51] Int. Cl.³ .............................................. B25C 7/00
[52] U.S. Cl. ..................................... 227/152; 227/30; 227/147; 29/243.51
[58] Field of Search ................... 227/16, 152, 30, 143, 227/147; 29/243.51

[56] References Cited

U.S. PATENT DOCUMENTS

| | | | |
|---|---|---|---|
| 3,101,481 | 8/1963 | Neale | 227/152 |
| 3,261,085 | 7/1966 | Hobson | 29/243.51 |
| 4,050,138 | 9/1977 | Stolz | 29/243.51 |
| 4,111,080 | 9/1978 | Pray | 29/243.51 |
| 4,333,217 | 6/1982 | Pray | 29/243.51 |

Primary Examiner—E. R. Kazenske
Assistant Examiner—Willmon Fridie, Jr.
Attorney, Agent, or Firm—Michael J. Striker

[57] ABSTRACT

This apparatus for fixing a row of assembling U-shaped fasteners to the end edge of a conveyor belt or the like by means of a pair of likewise U-shaped staples for each fastener, the staples having pointed ends adapted to pass through the fastener arms and the belt end edge disposed between these arms, comprises a fixed anvil underlying a vertically movable cover having a row of apertures corresponding in number to the fastener and matching the configuration of the staple pair, means for lowering the cover and cause the staple points to emerge partially from the fastener and penetrate slightly into the belt material, and a punch for driving the staple ends to a first partially bent condition obtained by the engagement of these points into skew-bottomed grooves formed in the anvil, whereafter the cover is raised and a hinged plate is tilted to its operative position in which it covers the anvil grooves, and finally the cover is lowered again towards the anvil in order to cause the staple points to be bent until they are definitively clinched against the lower arm of the fastener.

5 Claims, 8 Drawing Figures

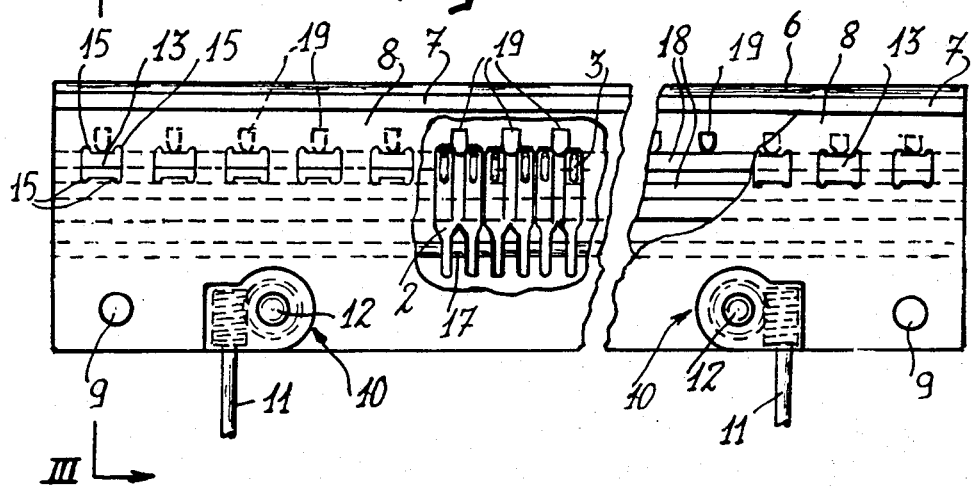
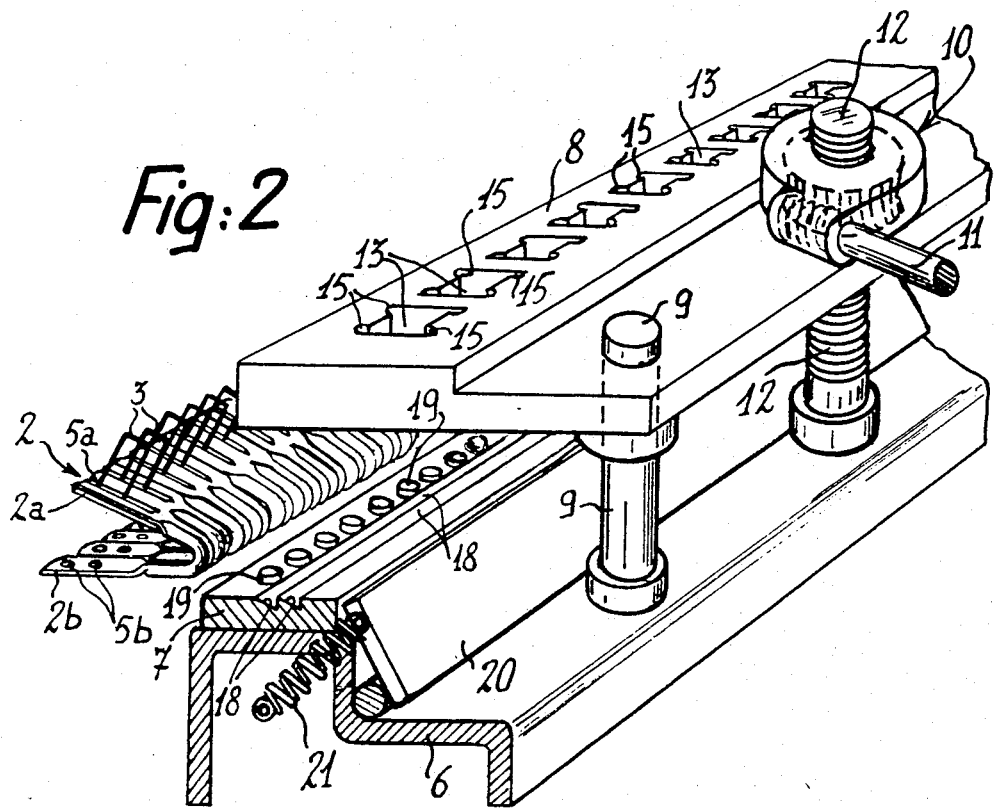

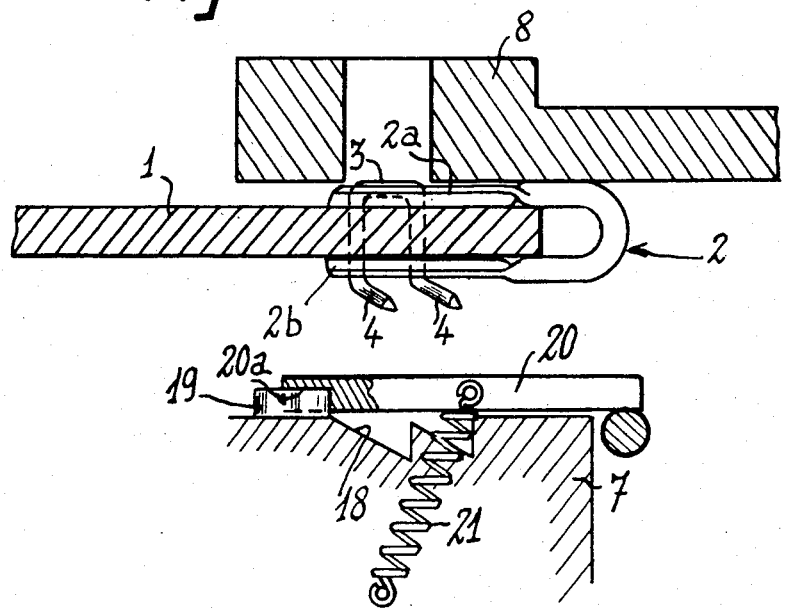
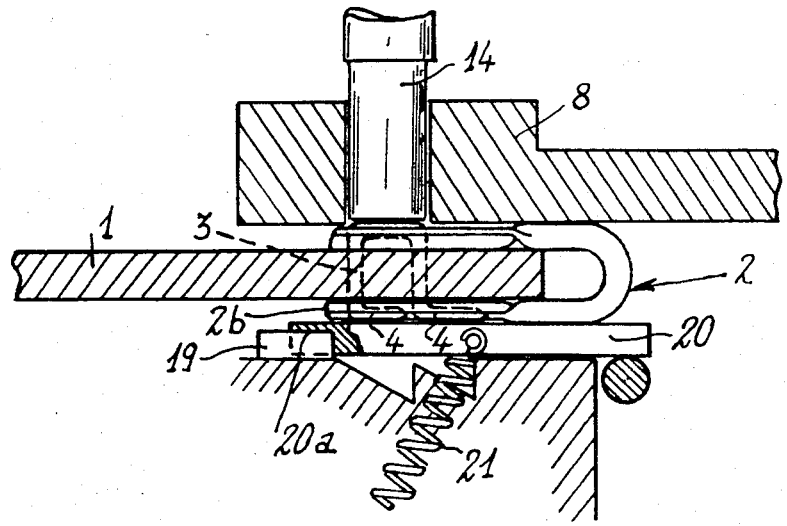

APPARATUS FOR FIXING BELT-FASTENERS OR THE LIKE

This application is a continuation of application Ser. No. 364,667, filed Apr. 2, 1982, now abandoned.

BACKGROUND OF THE INVENTION

The present invention relates to the fixing of a row of assembling fasteners to the end edge of a conveyor belt or the like.

More particularly, this invention relates to fasteners of the type consisting of U-shaped elements disposed straddlewise on the belt end edge so as to be fixed thereto by means of wire staples having the shape of inverted U. This fixing operation is carried out by driving the staples through holes formed in the two arms of the fasteners and then bending the staple points projecting from the fasteners.

To facilitate the fastener fixing operation and also take due account of the various thicknesses of the conveyor belts or the like to which they are to be fixed, one arm of said fasteners is initially in its "open" position, that is, in a position in which it is divaricated from the normal position. Thus, after inserting the edge of the belt or the like between the arms of the row to be fixed in position thereon, it is necessary to firstly fold in the initially open arm of the fasteners before driving the staples and bending the staple points.

THE PRIOR ART

The apparatus hitherto used for performing these various operations comprise two jaws movable in opposite directions, or a driving punch and an anvil member, also mounted for movement in opposite directions. These elements are responsive to a relatively complicated control mechanism adapted to accomplish the sequence of steps required for performing the operations contemplated, that is: closing the open arm of each fastener, driving the staples therethrough and finally bending the free staple points. Due to the complexity of this control mechanism, these apparatus constitute in fact heavy and cumbersome machines that are difficult to operate for example in the bottom of mine galleries. Besides, considering their relative fragility, these machines are scarcely suited for use in public works sites.

However, another important inconvenience of presently used apparatus lies in the fact that they are designed for closing and fixing the fasteners one by one. Now this procedure is attended by a certain creep of the rubber or other elastomer constituting the belt material. As a result, the belt end is liable to undergo alteration of its shape.

Another inconvenience characterizing this known system is that the apparatus must be shifted along the row of fasteners for closing and fixing each of them in succession. As a result, a great number of successive operations are required, which involves a loss of time and many tedious manoeuvres.

SUMMARY OF THE INVENTION

It is therefore the primary object of the present invention to provide an apparatus for fixing fasteners to belts and the like, which is of particularly simple and sturdy design, and adapted to be utilized efficiently and conveniently in various cases requiring the connection of the ends of a conveyor belt or the like on the site.

This apparatus is adapted to operate with fasteners of the above-mentioned type, in which the fixing staples are initially so disposed as to project above the level of the upper arms of the fasteners.

More particularly, this apparatus comprises:

a fixed anvil the length of which corresponds to that of the row of fasteners to be fixed;

above said anvil and parallel thereto, a movable cover of same length having a lower face adapted to receive the top arms of the fasteners constituting the row to be fixed;

in the cover, a row of apertures each disposed above the location of a specific fastener and adapted to receive the staples for fixing the relevant fastener when preliminarily fitting the row of fasteners against the lower face of said cover;

suitable control means for shifting the movable cover towards the fixed anvil and simultaneously causing the complete row of fasteners to tightly clamp the corresponding end edge of the belt or the like, and means provided in the cover apertures for enabling said apertures to subsequently receive a punch for driving the fixing staples engaged in said apertures.

Under these conditions only the staple driving step and the staple-point bending steps take place separately for each fastener. However, the initial closing of said fasteners and the clamping of the end edge of the belt thereby are accomplished in a same and single step and simultaneously for all the fasteners. This is particularly advantageous in that any risk of creeping, and altering the shape of, the belt material is safety precluded.

Another important and advantageous feature characterizing this invention lies in the fact that only one member, namely the cover, is movable, and that all the movements thereof take place in the same direction.

The apparatus of the present invention is also adapted to align in a particularly simple yet very reliable manner the holes formed through the upper arms of the fasteners with those of the lower arms. In fact, since the fasteners of the type involved are fixed by means of staples held without any play in the passage holes formed through these upper arms, it is absolutely necessary that the holes in the lower arms be exactly plumb below those of the upper arms of said fasteners.

To this end the fixed anvil is provided with abutment means adapted to stop the free edge of the lower arms of said fasteners during the folding thereof towards the belt, and in such a position that the holes of said lower arms be properly aligned with those of the upper arms.

Other features and advantages of the apparatus of the present invention will appear as the following description proceeds with reference to the accompanying drawings illustrating diagrammmatically by way of example a typical form of embodiment thereof. In the drawings:

BRIEF DESCRIPTION OF THE DRAWINGS

FIG. 1 is a plane view from above of an apparatus constructed according to the teachings of this invention;

FIG. 2 is a fragmentary perspective view showing on a different scale the same apparatus;

FIGS. 4–8 are similar sectional views showing the various successive operations accomplished by the apparatus of this invention.

DESCRIPTION OF THE PREFERRED EMBODIMENT

Figure 3:
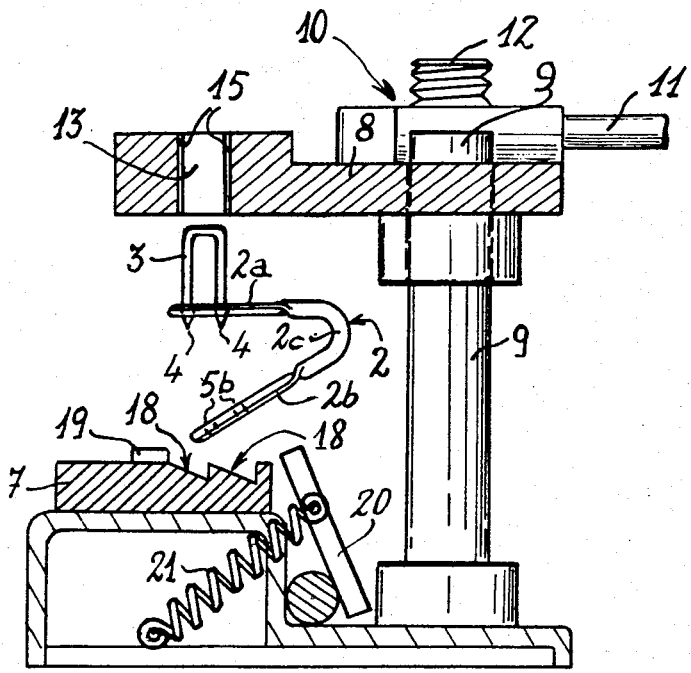
FIG. 3 is a section taken along the line III—III of FIG. 1, showing the initial operation consisting in positioning a row of fasteners in the apparatus.

As already mentioned in the foregoing, the apparatus constituting the subject matter of the present invention is designed for performing the various operations necessary for fixing to the end edge of a conveyor belt 1 a row of fasteners 2 adapted to be subsequently coupled to another row or similar fasteners fixed to the opposite end of the belt. The fasteners to be fixed to the belt end edge are of the type comprising U-shaped elements having each two arms 2a and 2b and a knuckle or elbow 2c; these fasteners 2 are adapted to be assembled in a hinge-like manner to similar fasteners fixed to the opposite end of the belt by means of a hinge pin (not shown). Initially, the lower arm 2b of each fastener 2 is open; in other words, this lower arm 2b is divaricated with respect to the upper arm 2a, instead of being parallel thereto. This upper arm 2a is provided with a pair of fixing staples 3 made of metal wire and having the shape of an inverted U. Thus, each staple 3 projects above the upper arm 2a of the relevant fastener and its sharp points 4 are engaged in passage holes 5a formed through this arm so as to merely project from the lower face of this arm 2a, as shown in FIG. 3. However, in this position the staple points fit in these holes 5a in such a way that they form substantially an integral part of the fastener 2, the various fasteners of the row being interconnected through suitable and known means (not shown). Of course, the lower arm 2b of fasteners 2 also comprise passage holes 5b adapted to be engaged by the staple points 4 after their passage through the belt 1.

The apparatus of this invention comprises a base forming steel section 6 supporting a fixed anvil 7 of same length as the row of fasteners to be fitted. Overlying this anvil 7 and parallel thereto is a movable cover 8 of same length. This cover 8 is slidably mounted on columns 9 carried by the steel section 6. Moreover, one or more control devices are provided for shifting the cover 8 toward and away from the anvil 7, and parallel thereto.

In the example illustrated the two control devices 10 are of the worm and wheel type comprising each a rotary driving shaft 11 adapted to be actuated by means of a crank (not shown). The gear tangent to each worm comprises a central screw-threaded bore engaged by the screw-threaded end 12 of a fixed shaft 12 rigid with steel section 6. Thus, these two devices can be actuated manually while being capable of exerting a considerable force due to their relatively high gear ratio. However, any other suitable mechanism may be substituted for this worm and gear device for controlling the movements of the movable cover 8.

This cover 8 has a series of apertures 13 formed therethrough, each aperture overlying the position contemplated for a specific fastener to be fixed in situ, and having a substantially square cross-sectional configuration corresponding to that of a punch 14 to be utilized subsequently for driving the fixing staples 3. However, these aperture comprise in each corner a longitudinal groove 15 adapted to be engaged by and to guide the relevant arm of either fixing staples 3 carried by the relevant fastener 2.

The fixed anvil 7 has two parallel longitudinal grooves 18 formed therein throughout the anvil length, each groove having an inclined bottom face and being disposed beneath the apertures 13 of said cover 8. Along said grooves 18 but on the side thereof opposite the elbow 2c of the fasteners the anvil 7 carries a row of spaced projecting studs 19 adapted to act as abutment means to the free edge 22 of the lower open arm 2b of the corresponding fastener during the closing thereof.

Associated with the fixed anvil 7, is a hinged movable plate 20 adapted to be tilted for covering the grooves 18 during the final step consisting in bending the projecting points 4 of the staples. This hinged plate 20 is urged against the base-forming steel section 6 by means of a pair of tension springs 21 disposed at the two ends of the hinged plate. Thus, the latter may be placed in two opposite stable positions, namely:

a first retracted or inoperative position (FIGS. 2 and 3);

an operative position shown in FIG. 8.

The above-described apparatus operates as follows.

1. Fitting the fasteners in position (FIG. 3):

Firstly, the row of fasteners 2 is engaged between the movable cover 8 and the anvil 7, the lower arms 2b of the fasteners being directed towards the anvil 7. Then the fasteners 2 are raised towards the cover 8 in order to cause their upper arms 2a to engage the cover bottom faces. Thus, the fixing staples 3 are driven into the cover apertures 13.

Figure 4:
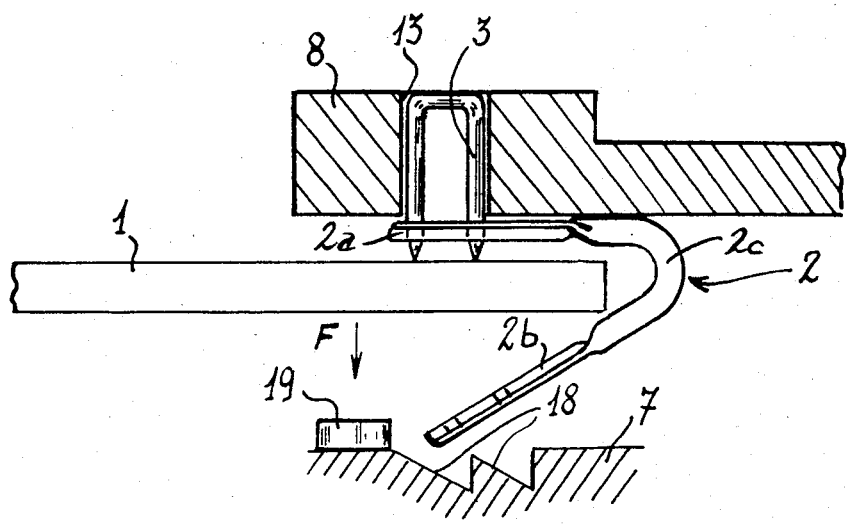

2. Closing the fasteners and clamping the belt end edge therewith:

The edge of belt 1 is inserted into the aligned open fasteners 2 as illustrated in FIG. 4, and the movable cover 8 is lowered by actuating the two control devices 10 towards the fixed anvil 7. The cover 8 carries along the row of fasteners so that the open lower arms 2b thereof eventually engage the anvil 7. More particularly, since these arms are initially in an oblique position with respect to the anvil, they firstly engage the latter with their free edges 22. Then, as the downward movement of the cover continues, the lower arms of the fasteners are folded against the relevant face of belt 1 while the free edges 22 of said arms slide on the top surface of the anvil.

However, during this slipping movement the edge 22 of the lower arm of each fastener abuts the relevant stud 19 carried by the anvil. Now, the position of each stud 19 is so calculated that the latter holds the lower arm of the corresponding fastener in a position such that the holes 5b formed therethrough are exactly aligned with the holes 5a of the upper arm 2a of the same fastener, irrespective of the thickness of the conveyor belt 1.

Consequently, a more or less pronounced distortion of the hinge-forming elbows 2c takes place when the fasteners are caused under the pressure of cover 8 to assume their final configuration in which the holes 5a and 5b are precisely aligned with each other.

Figure 5:
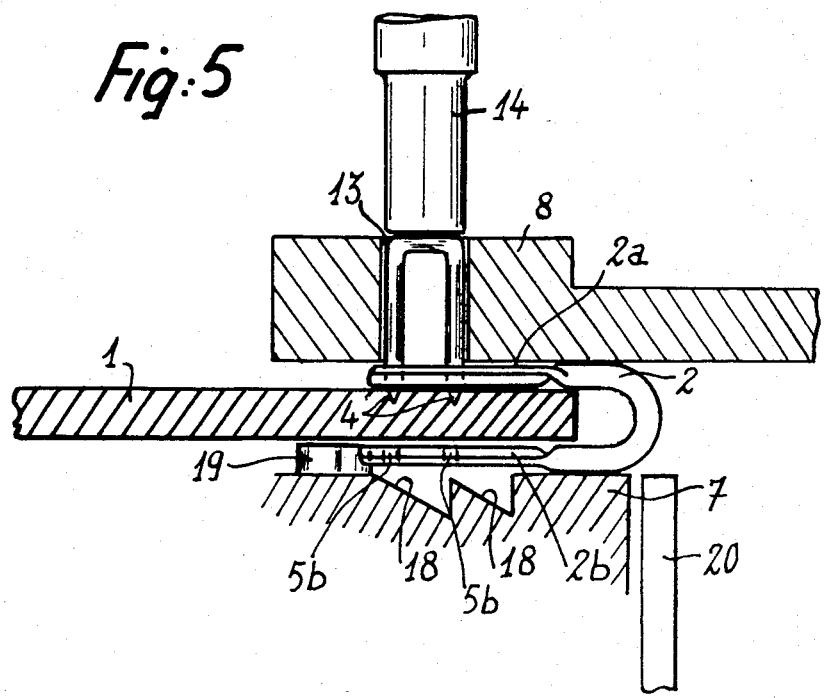

At the end of this operation the two arms of each fastener are firmly clamped against the belt end edge as shown in FIG. 5, the points 4 of the fixing staples 3 being slightly impressed into the top surface of the belt. Now it will be readily apparent that all the fasteners are closed and caused to clamp the belt edge in a single step. Therefore, any risk of creeping the belt material is definitely eliminated, in contrast to what is observed with apparatus performing the successive clamping of each fastener.

3. Driving the fixing staples:

This operation is carried out separately for each staple. To this end, the two fixing staples 3 of each fastener are driven home by disposing the punch 14 on top of the staple (see FIG. 5) and then hitting the punch by means of a hammer, mallet or maul.

The punch 14 will thus penetrate into the relevant aperture 13 of cover 8 and drive the pair of corresponding staples through the belt 1 and then through the holes 5b of the lower arm 2b of the corresponding fastener. This operation is not attended by any difficulty since the holes are exactly aligned with the holes 5a of the upper arm 2a, as a consequence of the above-described operation.

Figure 6:
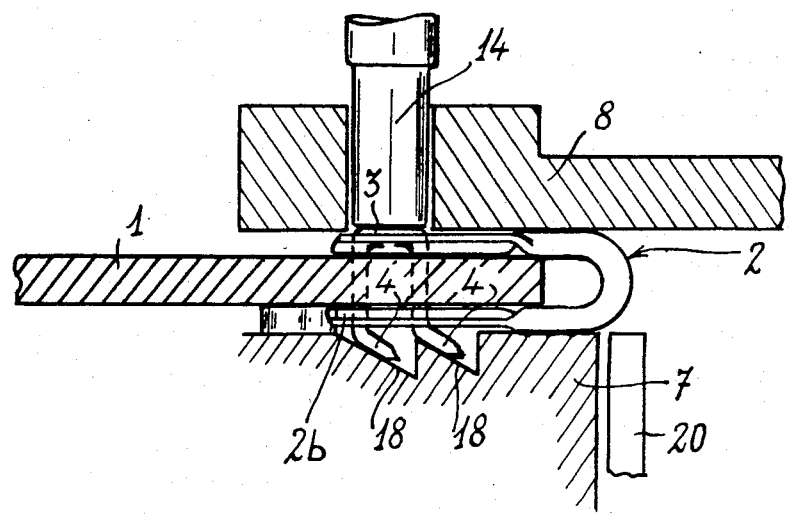

As they emerged from the holes 5b, the points 4 of staples engage the inclined bottoms of grooves 18, so that they assume the oblique position shown in FIG. 6. This constitutes the beginning of the driving bending of said staple points against the outer face of the lower arm 2b of the fastener.

It may be pointed out that throughout this driving operation exerted on the fixing staples of each fastener, the cover 8 is pressed against the fasteners, so that the latter are clamped against the belt 1.

4. Completion of the staple point bending step (Clinching):

When the staples of all the fasteners in the row have been driven as shown in FIG. 6, the movable cover 8 is raised temporarily together with the row of fasteners 2 and the bent end 1 so that the hinged plate 20 can be tilted to its operative position shown in FIG. 7, this plate 20 then covering the grooves 18 of anvil 7.

Then the clinching on bending of the staple points 4 is completed by lowering again the movable cover 8 towards the anvil while repeating the hitting of the staple heads by means of the same punch 14, as illustrated in FIG. 8.

Thus, the staple points 4 are bent flat against the hinged plate 20 covering the anvil 7, and clinched against the inner face of the lower arm 2b of the fastener.

From the foregoing it is clear that at the end of this last operation the fasteners 2 are safely attached to the end edge of belt 1. Now, except for the hand-operated punch 14, all the operations are carried out by using a single movable tool, namely the cover 8, in contrast to what is required with hitherto known apparatus comprising two movable tools actuated in opposite directions according to a predetermined sequence of movements obtained by means of a relatively complicated control mechanism. On the other hand, in the case of the apparatus of this invention the movements accomplished by said movable cover 8 are particularly simple and can be controlled by means of actuators also of very simple design and adapted to be operated manually as in the case of the example illustrated.

Under these conditions, an essential feature characterizing the apparatus of the present invention is its extreme simplicity. Besides, its weight is reduced considerably in comparison with other apparatus known in the art since it can easily be transported to the site where belt repair operations have to be carried out.

In this respect, it will be seen that the simplification of the apparatus of the present invention is made possible notably by the fact that the initial closing of the fasteners and the final clamping thereof step are obtained by simply lowering the cover 8 towards the fixed base member or steel section 6, whereby the free edge of the lower arm of the fastener is caused to slip on the base member 6 until this edge abuts the studs 19 provided for this purpose.

Under these conditions, the fasteners are closed and shaped to their final and desired configuration in which the holes 5b of the lower arm are exactly aligned with those 5a of the upper arm.

However, another essential feature characterizing this invention is that the closing and clamping of the fasteners on the belt end edge is carried out simultaneously for all the fasteners, so that any detrimental creeping of the belt material is safely avoided, al already explained hereinabove.

Of course, the present invention should not be construed as being strictly limited by the specific form of embodiment described hereinabove with reference to the accompanying drawings, since many modifications and variations may be brought thereto without departing from the basic principles of the invention, as will readily occur to those conversant with the art. Thus, instead of providing a separate hinged plate 20 for covering the skew-bottomed grooves 18, for completing the bending or clinching of the staple points 4, it would be possible to provide a sliding anvil comprising a flat plain portion adapted to be moved to a position beneath the staple points for carrying out this last step. Of course, it would also be possible to provide two interchangeable anvils, provided the one with skew-bottomed grooves 18 and the other with a flat top surface. On the other hand, the means for controlling the movable cover 8 may differ from those contemplated herein, provided that they are capable of exerting a sufficient presure on this movable cover 8.

I claim:

1. An apparatus for attaching to an end edge of a conveyor belt a row of fasteners having a length and including "U"-shaped elements each having upper and lower arms with free edges and holes and disposable straddlewise on the end edge of the conveyor belt, and pairs of similarly "U"-shaped staples having pointed ends, drivable through said holes of said pairs of arms of said "U"-shaped elements and projecting initially above said upper arms of said "U"-shaped elements, the apparatus comprising:

a stationary anvil having a length equal to the length of the row of fasteners to be attached, said stationary anvil having an upper surface provided with grooves in which said pointed ends of said staples engage for initial bending of said pointed ends of said staples having been previously driven through said fasteners;

a movable cover overlying and parallel to said stationary anvil, having a length equal to said length of said stationary anvil, a lower face adapted to receive said upper arms of said "U"-shaped elements of the row of fasteners, a series of apertures each of which disposed overlyingly to a respective one of said "U"-shaped elements of the row of fasteners and adapted to receive said pair of staples for attaching each of said "U"-shaped elements when the row of fasteners is preliminarily positioned against said lower face of said movable cover, said series of apertures of said movable cover having a configuration for complementarily receiving a punch for driving said staples that were previously engaged in said apertures;

control means for moving said movable cover towards said stationary anvil and simultaneously clamping all of said "U"-shaped elements of the row of fasteners to the end edge of the conveyor belt; and an additional hinge plate pivotable relative to said stationary anvil between an inoperative position in which it is located outside of said grooves of said stationary anvil during driving of said staples and initial bending of said pointed ends, and an operative position in which it overlies said stationary anvil and covers said grooves so as to form a flat abutment surface against which said pointed ends of said staples abut for final bending and clinching of said pointed ends.

2. An apparatus of claim 1; and further comprising means for reliably holding said hinge plate in said inoperative position and in said operative position, said holding means being formed as spring means.

3. An apparatus of claim 2, where said hinge plate is elongated and has a length substantially corresponding to the length of said stationary anvil and two ends spaced from one another in the direction of its elongation, said spring means including two springs each engaging a respective one of said ends of said hinge plate and biasing said hinge plate towards said anvil in said operative position.

4. An apparatus of claim 1 comprising
guiding means provided in said apertures for individually guiding each of the pairs of said staples for each fastener, said guiding means including two pairs of grooves formed in each of said apertures and arranged so that one of said pairs of grooves guides two legs of one staple and the other of said pairs of grooves guide two legs of the other staple of the same pair of said staples.

5. An apparatus of claim 4, wherein each of said apertures of said movable cover has four corners, each of said grooves of each of said two pairs of grooves being provided in a respective one of said corners of a respective one of said apertures.

* * * * *